(12) United States Patent
Florent et al.

(10) Patent No.: US 10,626,913 B2
(45) Date of Patent: Apr. 21, 2020

(54) BALL JOINT DEVICE FOR A TURBINE ENGINE

(71) Applicant: SAFRAN AIRCRAFT ENGINES, Paris (FR)

(72) Inventors: Nicolas Marc Florent, Moissy-Cramayel (FR); Marc Patrick Tesniere, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 192 days.

(21) Appl. No.: 15/312,168

(22) PCT Filed: May 7, 2015

(86) PCT No.: PCT/FR2015/051222
§ 371 (c)(1),
(2) Date: Nov. 17, 2016

(87) PCT Pub. No.: WO2015/177431
PCT Pub. Date: Nov. 26, 2015

(65) Prior Publication Data
US 2017/0102026 A1    Apr. 13, 2017

(30) Foreign Application Priority Data

May 21, 2014    (FR) ...................... 14 54559

(51) Int. Cl.
*F16C 11/06*    (2006.01)
*B64D 27/26*    (2006.01)
(Continued)

(52) U.S. Cl.
CPC .......... *F16C 11/0614* (2013.01); *B64D 27/26* (2013.01); *F16C 11/045* (2013.01);
(Continued)

(58) Field of Classification Search
CPC ..... Y10T 403/32631; Y10T 403/32704; Y10T 403/32861; Y10T 403/32863;
(Continued)

(56) References Cited

U.S. PATENT DOCUMENTS 2,838,331 A * 6/1958 Coleman .................. B62D 7/16
                                                            280/93.508
4,597,499 A * 7/1986 Hanula .................... B61G 7/10
                                                            213/50.5

(Continued)

FOREIGN PATENT DOCUMENTS

EP    0357504 A1    3/1990
FR    2887853 A1    1/2007
(Continued)

OTHER PUBLICATIONS

International Search Report with English Language Translation, dated Oct. 15, 2015, PCT Application No. PCT/FR2015/051222.

*Primary Examiner* — Michael P Ferguson
(74) *Attorney, Agent, or Firm* — Womble Bond Dickinson (US) LLP

(57) ABSTRACT

The ball joint device (10) for suspending a turbine engine from a strut or suspending equipment on the body of a turbine engine. Said device comprises a first member (12), one end of which carries a ball joint (14) and is interposed between the two lugs (16, 17) of a second member (18), the ball joint comprising a bore (28) for the passage of a shaft (30), the ends of which shaft pass through openings (20, 22) in the lugs. A first (16) of the lugs comprises or carries first means for axially holding the shaft on the side opposite the ball joint, which means comprise a cover (52, 52'), and a second (17) of the lugs comprises or carries second means (38) for axially holding the shaft on the side opposite the ball joint. The device further comprises a resilient member (62, 62') that is deformable under compression and is held by the (Continued)

cover, said resilient member (62, 62') being designed to bias a support element (40), through which the shaft passes and which is in axial abutment on the ball joint (14), axially in a direction away from the cover.

11 Claims, 3 Drawing Sheets

(51) Int. Cl.
    *F16C 11/04*    (2006.01)
    *F16C 23/04*    (2006.01)
    *F16C 27/02*    (2006.01)
(52) U.S. Cl.
    CPC ............ *F16C 23/043* (2013.01); *F16C 27/02* (2013.01); *B64D 2027/268* (2013.01); *F16C 2326/43* (2013.01); *F16C 2360/23* (2013.01)
(58) Field of Classification Search
    CPC ..... Y10T 403/32909; Y10T 403/32918; Y10T 403/32221; Y10T 403/32893; F16C 11/045; F16C 11/0623; F16C 11/0695; F16C 11/106; F16C 2326/43; F16C 2360/23; F16C 11/0614; B64D 27/26; B64D 2027/262; B64D 2027/264; B64D 2027/266; B64D 2027/268
    USPC ................ 403/122, 131, 150, 154, 156, 157
    See application file for complete search history.

(56) References Cited

U.S. PATENT DOCUMENTS

| | | | | |
|---|---|---|---|---|
| 4,858,962 A * | 8/1989 | Bolling | ................ | B25J 17/0258 285/121.7 |
| 4,889,458 A * | 12/1989 | Taylor | ..................... | F16B 21/10 411/383 |
| 4,943,013 A * | 7/1990 | Kapala | ................... | B64D 27/26 244/54 |
| 5,044,812 A * | 9/1991 | Ardelt | ..................... | E02F 9/006 403/154 |
| 5,961,141 A * | 10/1999 | Goel | ....................... | E02F 9/006 280/515 |
| 7,798,345 B2 * | 9/2010 | Krome | ..................... | B61G 5/02 213/12 |
| 8,192,104 B2 * | 6/2012 | Mann | ...................... | F16C 11/02 403/152 |
| 8,596,603 B2 * | 12/2013 | Gallet | ................... | F01D 25/162 244/53 R |
| 8,851,417 B2 * | 10/2014 | Sandy | .................... | B64D 27/26 244/54 |
| 8,893,368 B2 * | 11/2014 | Williams | ............ | F16C 11/0614 244/102 A |
| 2008/0156930 A1 * | 7/2008 | Audart-Noel | .......... | B64D 27/26 244/54 |
| 2009/0120234 A1 * | 5/2009 | Aare | ........................ | F16B 3/06 74/580 |
| 2015/0166191 A1 * | 6/2015 | Cassagne | ............... | B64D 27/26 244/54 |
| 2015/0167726 A1 * | 6/2015 | Cassagne | ................ | F16B 39/24 411/136 |

FOREIGN PATENT DOCUMENTS

| | | |
|---|---|---|
| JP | H0249797 U | 4/1990 |
| JP | 2003205251 A | 7/2003 |

* cited by examiner

BALL JOINT DEVICE FOR A TURBINE ENGINE

TECHNICAL FIELD

The present invention relates to a ball joint device for suspending a turbine engine from a strut or suspending an item of equipment on the body of a turbine engine.

Prior Art

The prior art comprises in particular the documents FR-A1-2 887 853, EP-A1-0 357 504, JP-A-2003 205251 and JP H02 49797.

A turbine engine is generally suspended from a strut by means of a yoke that is fixed to the body of the turbine engine, at the intermediate casing thereof. This yoke comprises clevises on which ends of connecting rods are hinged, the other ends of which rods are connected to means for suspending the turbine engine on the strut. Each connecting rod is in general hinged on a clevis by means of a ball joint device.

In the prior art, each connecting rod has an end that carries a ball joint and is interposed between the two lugs of a clevis, the ball joint comprising a bore for the passage of a shaft, the ends of which pass through openings in the lugs of the clevis.

The devices of this type currently used are, however, not entirely satisfactory from a safety point of view. One important safety criterion is that the connection of a connecting rod to a clevis be maintained in particular in the event of fracture of the shaft passing through the ball joint carried by the connecting rod.

In each of the applications FR-A1-2 879 695 and FR-A1-2 923 460 for example, in the event of fracture of the shaft, the fractured parts of the shaft may emerge from the openings in the lugs, which would result in a fracture of the connection between the connecting rod and the clevis.

The aim of the present invention is in particular to provide a simple, effective and economical solution to this problem.

DISCLOSURE OF THE INVENTION

The invention proposes a ball joint device for suspending a turbine engine from a strut or suspending an item of equipment on the body of a turbine engine, comprising a first member, one end of which carries a ball joint and is interposed between the two lugs of a second member, the ball joint comprising a bore for the passage of a shaft, the ends of which pass through openings in the lugs, a first of the lugs comprising or carrying first means for axially holding the shaft on the side opposite the ball joint, and a second of the lugs comprising or carrying second means for axially holding the shaft on the side opposite the ball joint, characterised in that the first axial holding means comprise a cover that is fixed to the first lug and which covers a first end of the shaft at least in part or is formed in one piece with the first end of the shaft, and in that the device further comprises a resilient member that is deformable under compression and is held by the cover, said resilient member being designed to axially bias a support element, through which the shaft passes and which is in axial abutment on the ball joint, in a direction away from the cover.

The device according to the invention is therefore equipped with means for axially holding the shaft so that said shaft does not become disconnected from the lugs. Thus, even in the event of fracture of the shaft, these fractured parts are held and do not become dislodged from the openings in the lugs, which makes it possible to preserve the connection of the first and second members.

Moreover, the resilient member, which axially biases the ball joint on the side opposite the cover, makes it possible, after mounting, to eliminate axial clearance between the ball joint and two holding elements, for example in the form of bushings, that are arranged axially on either side of the ball joint and axially immobilise the ball joint on the shaft. Such an axial clearance is generally necessary for mounting the ball joint since, before the shaft is mounted, the ball joint must be positioned between the two lugs of the second member, once the holding elements have also been positioned by bringing them into the interior space extending between the two lugs. This clearance is detrimental during operation since it may promote unnecessary axial movement of the ball joint and accelerated wear thereof, of the shaft, or even also of the two holding elements. In other words, the resilient member ensures, during operation, the elimination of the axial ball-joint mounting clearance.

The device according to the invention may comprise one or more of the following features, taken in isolation from one another or in combination with one another:

the second axial holding means comprise a holding element that is arranged on the side of the second lug opposite the ball joint, and an axial clearance is provided between a second end of the shaft and said holding element so that said element is not biased axially by the shaft except possibly in the event of fracture of the shaft; because of this axial clearance, the shaft is not in abutment on the holding element during operation and therefore does not exert any stresses on this element, which is advantageous, a first bushing comprising the support element is mounted in the opening of the first lug and has the shaft passing therethrough, the support element is formed by an external annular rim at one end of the first bushing on the ball-joint side, in the mounting position, an axial clearance is provided between the first lug and the support element, the resilient member is directly or indirectly in axial abutment on one end of the first bushing, a second bushing comprising the holding element is mounted in the opening in the second lug and has the shaft passing therethrough, the holding element being formed by an internal annular rim of said second bushing, the second bushing comprises, at an internal end on the ball-joint side, an external annular rim interposed between an internal lateral face of the second lug and the ball joint, and in that the ball joint is biased indirectly by said resilient member in order to bear axially on said external annular rim, the resilient member, such as a Belleville washer, is mounted so as to be axially clamped between the cover and the first end of the shaft in order to axially bias said shaft in a direction away from the cover, said first end of the shaft comprising an external annular rim that is in axial abutment on one end of the first bushing on the side opposite the ball joint, the or each bushing is designed to be mounted in the opening in the corresponding lug, from the internal space extending between said lugs, the cover is approximately annular in shape and comprises an external peripheral portion that extends around said end of the shaft and is applied and fixed to an external lateral face of the first lug, and the cover is fixed to the shaft.

The present invention also relates to a turbine engine, such as an aircraft turbojet engine or turboprop engine, characterised in that it is equipped with at least one device as described above.

DESCRIPTION OF THE FIGURES

The invention will be better understood and other details, features and advantages of the invention will emerge upon reading the following description given by way of non-limitative example and with reference to the accompanying drawings, in which.

DETAILED DESCRIPTION

Figure 1:
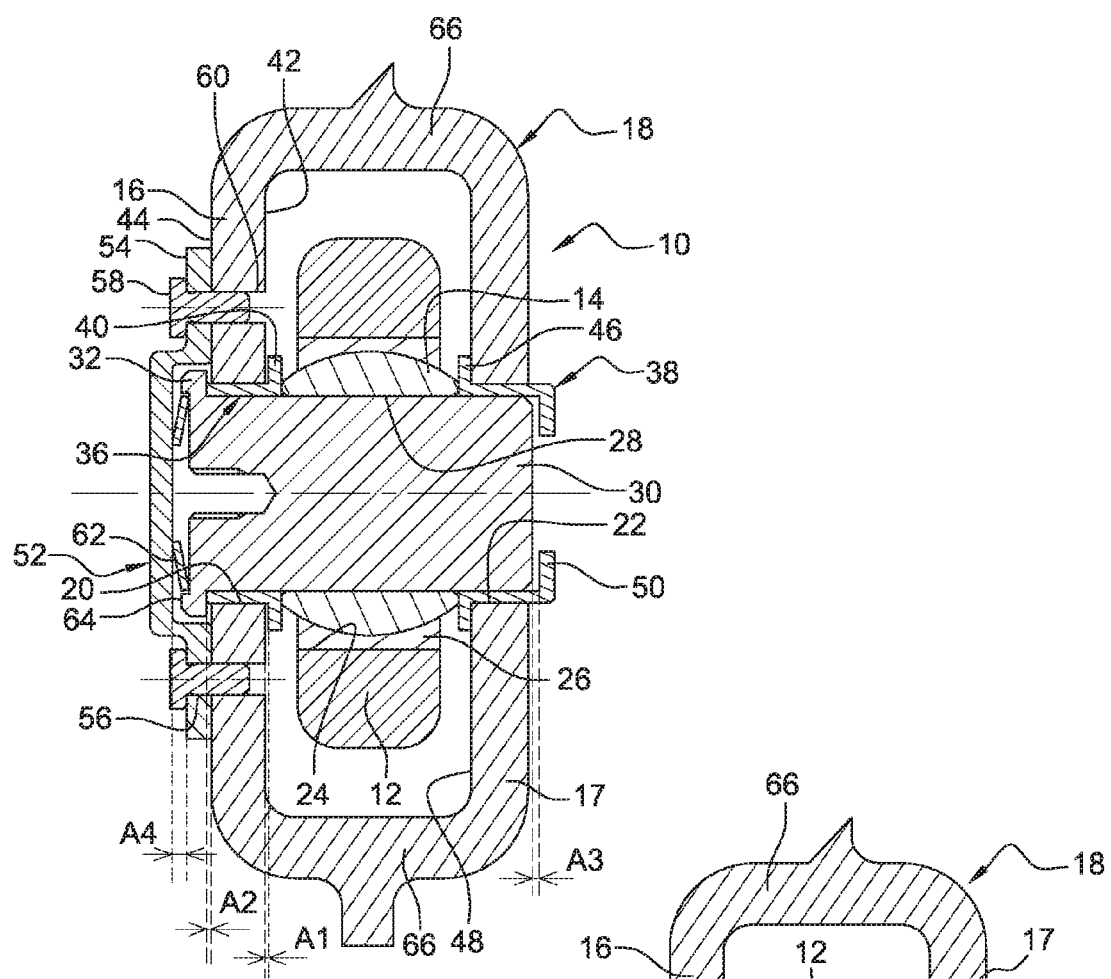
FIG. 1 is a schematic axial sectional view of an embodiment of the ball joint device according to the invention.

FIGS. 1 to 6 show a first embodiment of the ball joint device 10 according to the invention. This device 10 comprises a connecting rod 12, one end of which carries a ball joint 14 and is interposed between the two lugs 16, 17 of a clevis 18.

In the case of the suspension of a turbine engine from a strut, the clevis 18 is typically formed together with or fixed to a casing of the engine. The clevis 18 is of the female type and its two lugs 16, 17 are flat and parallel to each other, these lugs 16, 17 comprising coaxial openings 20, 22 having cylindrical internal walls.

The connecting rod 12 is connected to means for suspension on the strut and the end of said rod that can be seen in the drawing is flat and comprises an opening 24 having an internal cylindrical wall for mounting a cage 26 that is clamped in the opening and the internal spherical wall of which receives the ball joint 14, which is free to rotate in the cage 26. The ball joint 14 comprises a cylindrical bore 28 through which a shaft 30 having a cylindrical body passes, the ends of which shaft pass into the openings 20, 22 in the lugs 16, 17. The shaft 30 comprises an external annular rim 32 at a first end.

In the example shown, two bushings 36, 38 are mounted in the openings 20, 22, respectively, in the lugs. These bushings 36, 38 are coaxial and each comprise a tubular cylindrical body.

A first bushing 36 is engaged in the opening 20 from the internal side of the lug 16 and comprises, at its internal end (located on the same side as the ball joint 14), an external annular rim 40 that is opposite the internal lateral face 42 of the lug 16 (and, more precisely, that extends opposite the peripheral portion of the face 42 extending around the opening 20).

As can be seen in FIG. 1, in the mounting position, the rim 40 is separated from the face 42 by an axial clearance A1. The rim 40 of the first bushing 36 bears on the ball joint 14. The rim 40 therefore forms a support element through which the shaft 30 passes and which is in axial abutment on the ball joint. This support element 40 is, in this case, formed by the bushing 36, but it would also be possible to have, for example, a bushing 36 without an external annular rim, the support element 40 being formed by an annular washer interposed axially between the bushing 36 and the ball joint 14. Moreover, the rim 32 of the shaft 30 is in axial abutment on the external end (located on the side opposite the ball joint) of the bushing 36 and is separated from the external face 44 of the lug by an axial clearance A2.

The second bushing 38 is engaged in the opening 22 from the internal side of the lug 16, and comprises, at its internal end (located on the same side as the ball joint), an external annular rim 46 that is opposite the internal lateral face 48 of the lug (and, more precisely, that extends opposite the peripheral portion of the face 48 extending around the opening 22). As can been seen in FIG. 1, in the mounting position, the rim 46 is in axial abutment on the face 48. The rim 46 of the second bushing 38 bears on the ball joint.

The second bushing 38 comprises, at its external end (located on the side opposite the ball joint), an internal annular rim 50 for axially holding the shaft 30, towards the outside of the lug 18. As can be seen in FIG. 1, in the mounting position, the rim 50 is separated from the shaft 30 by an axial clearance A3 so that axial abutment is caused between the shaft 30 and the second bushing 38. Such an axial abutment would in fact risk compromising the axial abutment of the shaft 30 on the first bushing 36 and therefore compromise the clamping of the ball joint 14 between the two bushings. In the event of fracture of the shaft 30 (cf. FIG. 2), the portion 30a of the shaft extending in the second bushing 38 can bear axially on the rim 50 of this bushing 38 and thus be held and prevented from becoming disconnected from the lug 17.

Figure 2:
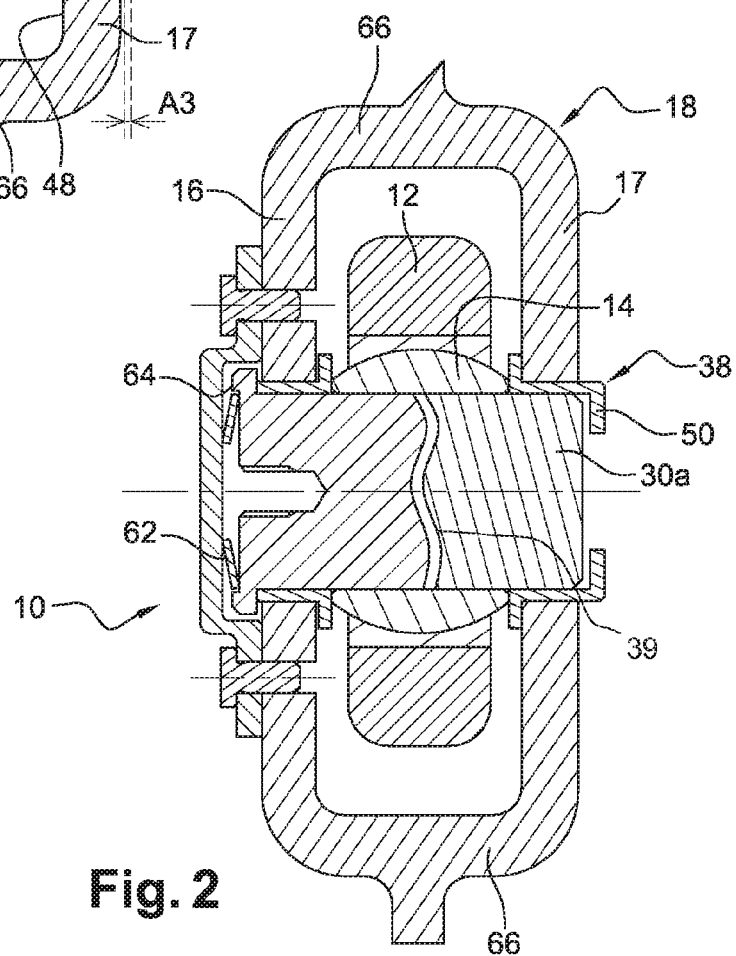
FIG. 2 is a schematic axial sectional view of the ball joint device of FIG. 2, the shaft here being fractured.
Figure 3:
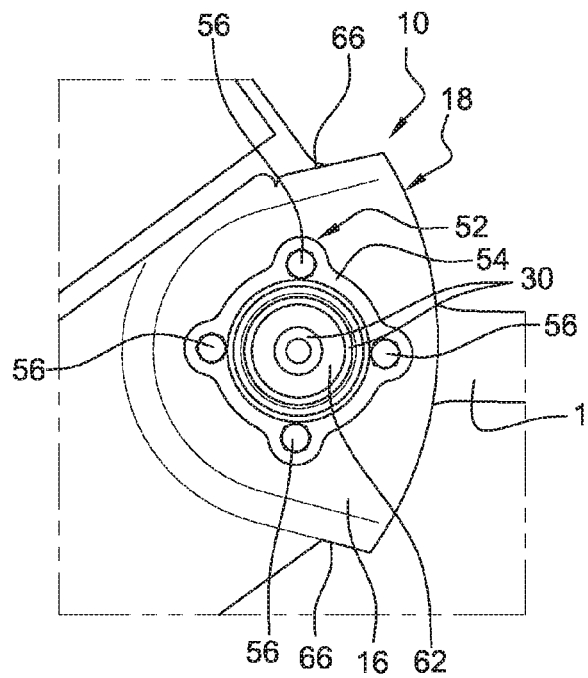
FIGS. 3 to 6 are schematic perspective views of the ball joint device of FIG. 2.
Figure 4:
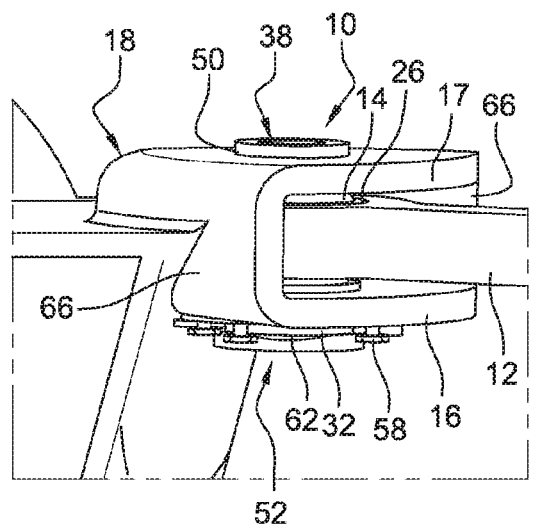
Figure 5:
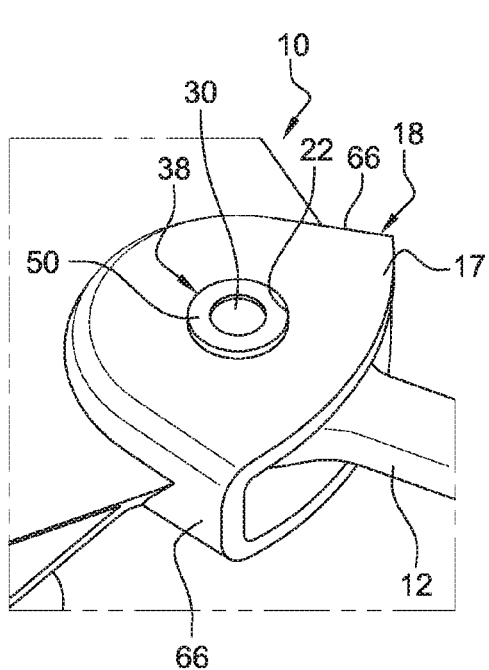
Figure 6:
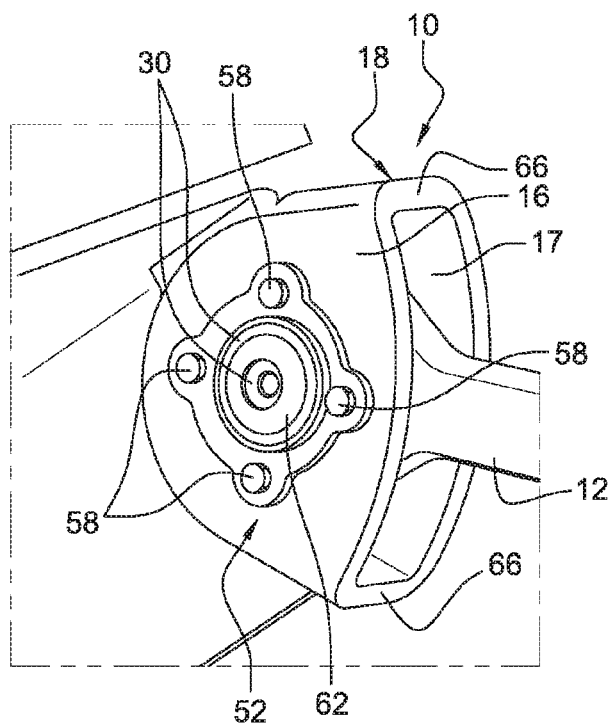

In FIG. 2, the fracture in the shaft 30 is denoted by reference sign 39. Preferably, this fracture occurs at a position on the shaft 30 that substantially corresponds to the middle of the bore of the ball joint in the axial direction, and so that the fracture surface extends, as far as possible, substantially in the radial direction with respect to the shaft. Thus the two broken portions of the shaft 30 continue to hold the ball joint. For this purpose, the shaft 30 may comprise, substantially at the centre thereof, a region of relative weakness that promotes fracture of the shaft in this region rather than elsewhere, without compromising the general strength of the shaft. This region of relative weakness may be produced by a peripheral annular groove on the shaft, having a sufficiently small depth in relation to the diameter of the shaft to preserve the mechanical performance of said shaft.

The bushing 38 thus forms means for holding the shaft 30, these means being carried by the lug 17, as is clear from the drawings. The device 10 according to the invention comprises other means for holding the shaft 30, these means being carried by the other lug 16 and, here, comprising a cover 52 that is attached and fixed to the lug 16.

In the example shown, the cover 52 is annular in shape and covers the end of the shaft 30 comprising the rim 32. The cover 52 is arranged outside the lug 16 and its external periphery 54 extends around the rim 32 of the shaft 30 and is applied and fixed to the external face 44 of the lug 16. The cover 52 comprises, here, four openings 56 at its periphery 54 for screws 58 to pass through, which screws are screwed directly from the outside into the threaded openings 60 of the lug 16. The screws 58 extend here substantially in parallel with the shaft 30.

A resilient member 62 that is deformable under compression is mounted so as to be axially clamped between the cover 52 and the end of the shaft 30 comprising the rim 32. This resilient member 62 is prestressed once the cover 52 is fixed to the lug 16, and axially biases the shaft 30 towards the side opposite the cover 52. Since the rim 32 of the shaft 30 is in axial abutment on the first bushing 36 by virtue of the axial clearance A2, the resilient member 62 axially biases the support element 40, which is in axial abutment on the ball joint 14, in a direction away from the cover. In this case, the resilient member 62 is a Belleville washer, the external periphery of which is in abutment on the shaft 30 and is surrounded by a cylindrical rim 64 of the shaft 30 that centres the washer relative to the shaft and guides the compression thereof. In the mounting position, the shaft 30 is therefore separated from the cover 52 by an axial clearance A4, where the resilient member 62 extends.

In this first embodiment, arranging the washer 62 between the shaft 30 and the cover 52 is a considerable advantage. This is because the washer may have more or less the same diameter as the shaft, although a substantial difference between the two diameters is possible, and furthermore the axial clearance A4 may be provided so as to be greater or lesser by adapting the axial dimension of the cover 52 for this purpose. Thus, taking a commercially available washer having a diameter more or less close to the diameter of the shaft 30, the cylindrical rim 64 will be adapted to the end of the shaft according to the diameter of the washer selected, and a suitable axial clearance A4 will be provided to take account of the height of the washer. In this way, development costs are saved that would be required if it were necessary to impose specific dimensions on the washer that are not found in commercially available washers.

As can be seen in FIGS. 3 to 6, the lugs 16, 17 of the clevis 18 are interconnected by stiffening walls 66 that extend substantially in parallel with the shaft 30.

The device 10 according to the invention can be mounted as follows. The bushings 36, 38 are mounted in the openings 20, 22 in the lugs 16, 17 of the clevis 18 from the inside of the lugs, as described above. The ball joint 14 carried by the connecting rod 12 is engaged between the lugs and arranged between the bushings 36, 38 so that its bore 28 is aligned with the bores of the bushings. The engagement of the ball joint 14 is facilitated by the clearance A1 which makes it possible for the mounting to increase the distance between the bushings 36, 38 by a distance Al beyond the axial dimension of the ball joint 14. This clearance A1 is therefore the axial mounting clearance that can be provided between the ball joint and the two holding elements, here the bushings 36 and 38, arranged axially on either side of the ball joint. The shaft 30 is then engaged in the bushing 36, the bore of the ball joint 14, and then the bushing 38, until the rim 32 of said shaft comes into abutment on the bushing 36. The resilient member 62 is placed on the shaft 30, and then the cover 52 is mounted on the resilient member 62 and is fixed to the lug 16 by means of the screws 58. Tightening of the screws 58 causes compression of the resilient member 62, causes the rim 32 of the shaft 30 to be held in abutment on the bushing 36, and causes the ball joint 14 to be clamped between the bushings 36, 38. The rigidity of the resilient member 62 is designed to be sufficient so that, during operation, the bushing 36 remains axially immobile on the shaft 30. It is then said that the axial mounting clearance of the ball joint is eliminated during operation. This clearance is recreated when the device is dismantled, for example for maintenance, as soon as the cover 52 is dismantled, since the spring 62 then no longer biases the support element 40.

Figure 7:
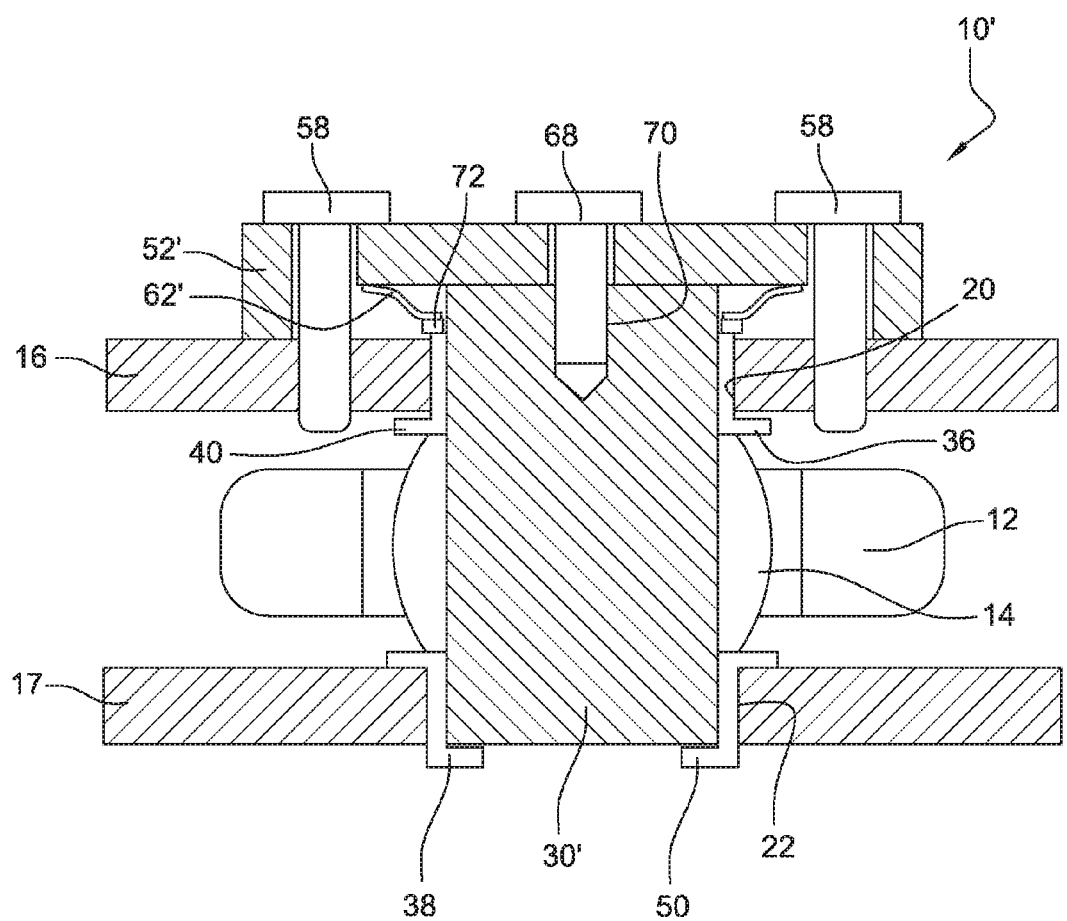
FIG. 7 is a partial schematic axial sectional view of another embodiment of the ball joint device according to the invention.

FIG. 7 shows another embodiment of the ball joint device 10' according to the invention. The elements of the device 10' already described above in relation to the device 10 are denoted by the same reference signs in FIG. 7.

It can be see that, in this embodiment, the means for axially holding the shaft 30', carried by the lug 17, comprise a bushing 38 identical to that of the first embodiment.

In this case, the holding means carried by the lug 16 comprise a cover 52' that covers one end of the shaft 30' at least in part. The cover 52' is fixed to the shaft 30', here by a screw 68 that is coaxial with the shaft 30' and is screwed into a threaded opening 70 in the end of the shaft, and also to the lug 16, by screws 58 similar to those described above. In a variant, the cover 52' could be formed in one piece with the shaft 30'.

In the example shown in FIG. 7, the assembly formed by the cover 52' and the screws 58 ensure that the shaft 30' is axially held on the side of the lug 16 opposite to the ball joint 14. In the aforementioned variant, it would be the screws 58 only that would ensure that the shaft 30' is axially held in this direction.

The resilient member 62' that is deformable under compression is in this case mounted so as to be clamped axially between the cover 52'and the bushing 36 that is mounted in the opening 20 in the lug 16. In this case, the resilient member 62' extends around the shaft 30'. The resilient member 62' axially biases the bushing 36 in a direction away from the cover 52'. The support element 40 formed by the bushing 36 is therefore biased by the resilient member 62' so as to bear axially on the ball joint 14. It will be noted that, as in the previous embodiment of the device 10, an axial distance provided between the support element 40 and the internal surface of the first lug 16, corresponding to the aforementioned distance A1, makes it possible to provide the axial mounting clearance for the ball joint.

The resilient member 62' may be directly in axial abutment on one end of the bushing 36. In contrast, in the example shown, the resilient member 62' is indirectly in axial abutment on this end of the bushing 36 since a ring 72 is interposed between the resilient member 62' and this end. This resilient member 62' may also be a Belleville washer.

In this case, the resilient member 62' is dimensioned so that its inside diameter is very slightly greater than the diameter of the shaft 30'.

This embodiment makes it possible to remove the assembly comprising the cover 52', the shaft 30' and the member 62', together with the ring 72, in a single unit during dismantling, once the screws 58 fixing the cover 52' are removed from the clevis.

The invention claimed is:

1. A ball joint device for suspending a turbine engine from a strut or suspending an item of equipment on the body of a turbine engine, comprising:
   a connecting rod, one end of which pivotably carries a ball member and is interposed between two lugs of a clevis,
   the ball member comprising a bore through which a shaft having two ends is received,
   the ends of said shaft passing through aligned openings in the lugs,
   a first of the lugs comprising a cover for axially holding the shaft on an external lateral side of the first lug opposite the ball member, the cover being fixed to the first lug, the cover covering a first end of the shaft at least in part or being affixed to the first end of the shaft,
   a first bushing mounted in the opening in the first lug and having the shaft passing therethrough, the first bushing having an abutment surface on an internal lateral side of the first lug directly or indirectly in axial abutment with the ball member,
   a second of the lugs comprising a second bushing for axially holding the shaft on a external lateral side of the second lug opposite the ball member, the second bushing being mounted in the opening in the second lug and having the shaft passing therethrough, the second bushing having an abutment surface on an internal lateral side of the second lug, a resilient member that is deformable under compression and is held against an internal lateral side of the cover axially between the cover and the first bushing, said resilient member axially biasing the first bushing in a direction away from the cover and against the ball member, and the first bushing being axially movable within the opening in the first lug and being biased by the resilient member such that the first bushing abutment surface is axially spaced from the internal lateral side of the first lug, and such to clamp the ball member between the first bushing and the second bushing abutment surfaces.

2. The device according to claim 1, wherein the second bushing comprises a holding clement arranged on the external lateral side of the second lug opposite the ball member, and an axial clearance is provided between a second end of the shaft and said holding element so that said holding element is not axially biased by the shaft except possibly in the event of fracture of the shaft.

3. The device according to claim 1, wherein the first bushing abutment surface is formed by an external annular rim at one end of the first bushing on the ball member side.

4. The device according to claim 1, wherein the resilient member is directly or indirectly in axial abutment on one end of the first bushing.

5. The device according to claim 1, wherein the second bushing comprises a holding element formed by an internal annular rim of said second bushing.

6. The device according to claim 5, wherein the second bushing abutment surface comprises an external annular rim that is interposed between the internal lateral side of the second lug and the ball member, and in that the ball member is biased indirectly by said resilient member in order to bear axially on said external annular rim.

7. The device according to claim 5, wherein each bushing is to be mounted in the opening in the corresponding lug, from the internal space extending between said lugs.

8. The device according to claim 1, wherein the resilient member, is mounted to be axially clamped between the cover and the first end of the shaft in order to axially bias said shaft in a direction away from the cover, said first end of the shaft comprising an external annular rim that is in axial abutment on one end of the first bushing on the side opposite the ball member.

9. The device according to claim 1, wherein the cover comprises an external peripheral portion that extends around said first end of the shaft and is applied and fixed to an external lateral face of the first lug.

10. The device according to claim 1, wherein the cover is fixed to the shaft.

11. A turbine engine, an aeroplane turbojet engine or a turboprop engine, equipped with at least one device according to claim 1.

* * * * *